US012764698B2

(12) United States Patent
Fakoorian et al.

(10) Patent No.: US 12,764,698 B2
(45) Date of Patent: Oct. 13, 2026

(54) POSITIONING TECHNIQUES FOR USER EQUIPMENT IN A NETWORK

(71) Applicant: Apple Inc., Cupertino, CA (US)

(72) Inventors: Seyed Ali Akbar Fakoorian, San Diego, CA (US); Chunxuan Ye, San Diego, CA (US); Dawei Zhang, Saratoga, CA (US); Haitong Sun, Cupertino, CA (US); Hong He, San Jose, CA (US); Huaning Niu, San Jose, CA (US); Jie Cui, San Jose, CA (US); Oghenekome Oteri, San Diego, CA (US); Wei Zeng, Saratoga, CA (US); Yang Tang, San Jose, CA (US); Yushu Zhang, Beijing (CN); Zhibin Wu, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/754,495

(22) PCT Filed: Apr. 6, 2021

(86) PCT No.: PCT/CN2021/085711

§ 371 (c)(1),
(2) Date: Apr. 4, 2022

(87) PCT Pub. No.: WO2022/213282

PCT Pub. Date: Oct. 13, 2022

(65) Prior Publication Data

US 2024/0057011 A1 Feb. 15, 2024

(51) Int. Cl.

| | |
|---|---|
| ***H04W 64/00*** | (2009.01) |
| ***G01S 5/02*** | (2010.01) |
| ***G01S 5/10*** | (2006.01) |

(52) U.S. Cl.
CPC .......... *H04W 64/00* (2013.01); *G01S 5/0236* (2013.01); *G01S 5/10* (2013.01)

(58) Field of Classification Search
CPC ... H04W 64/00; H04W 56/004; G01S 5/0236; G01S 5/10; G01S 5/0205; G01S 5/021; G01S 13/74; H04L 5/0048
See application file for complete search history.

(56) References Cited

U.S. PATENT DOCUMENTS

| | | | | |
|---|---|---|---|---|
| 10,649,064 | B2 * | 5/2020 | Edge | H04W 64/003 |
| 2018/0343635 | A1 | 11/2018 | Edge et al. | |

(Continued)

FOREIGN PATENT DOCUMENTS

| | | |
|---|---|---|
| CN | 108370551 | 8/2018 |
| CN | 109683130 | 4/2019 |

(Continued)

OTHER PUBLICATIONS

Huawei et al., "Enhancement to mitigate gNB and UE Rx/Tx timing error", 3GPP TSG RAN WG1 Meeting #104-e, R1-2100195, Feb. 5, 2021, 9 sheets.

*Primary Examiner* — Kabir A Timory
(74) *Attorney, Agent, or Firm* — Fay Kaplun & Marcin, LLP

(57) ABSTRACT

A location management function (LMF) of a network provides timing errors to user equipment and/or base stations for positioning purposes. The LMF receives an indication of an effective timing error for a downlink time difference of arrival (DL-TDOA) positioning technique, wherein the effective timing error is associated with a set of base stations configured to transmit positioning reference signals for the DL-TDOA and provides the effective timing error to a user equipment (UE) performing operations related to the DL-TDOA.

16 Claims, 6 Drawing Sheets

(56) References Cited

U.S. PATENT DOCUMENTS

| | | | | |
|---|---|---|---|---|
| 2019/0297595 | A1* | 9/2019 | Sirotkin | H04W 8/02 |
| 2020/0137715 | A1 | 4/2020 | Edge et al. | |
| 2020/0264261 | A1* | 8/2020 | Akkarakaran | H04W 8/24 |
| 2021/0185632 | A1* | 6/2021 | Manolakos | H04L 5/0094 |
| 2021/0410103 | A1* | 12/2021 | Zhang | H04L 5/0048 |
| 2022/0039056 | A1* | 2/2022 | Manolakos | H04W 24/10 |

FOREIGN PATENT DOCUMENTS

| | | |
|---|---|---|
| CN | 110167135 | 8/2019 |
| EP | 3541126 | 9/2019 |

* cited by examiner

POSITIONING TECHNIQUES FOR USER EQUIPMENT IN A NETWORK

BACKGROUND INFORMATION

In Fifth Generation New Radio (5G NR) networks, the network and/or the user equipment (UE) operating on the network may desire to accurately know the physical location of the UE. The physical location may be used to provide the UE with required information for the particular location (e.g., emergency numbers, mobile country code (MCC) information, etc.), to allow an application executing on the UE to operate efficiently, etc. In some instances, this physical location may be based on a Global Navigation Satellite system (GNSS). However, in other instances, the devices of the 5G NR network (e.g., the next generation NodeBs (gNBs), network components, etc.) and the associated UE may be used to determine the physical location of the UE. Accurate location information may be vital for various operations that are performed by the UE and/or the network. Thus, both users of the UE and the network operators are interested in manners of improving the location accuracy for a UE.

SUMMARY

Some exemplary embodiments are related to a location management function (LMF) of a network configured to perform operations. The operations include receiving an indication of an effective timing error for a downlink time difference of arrival (DL-TDOA) positioning technique, wherein the effective timing error is associated with a set of base stations configured to transmit positioning reference signals for the DL-TDOA and providing the effective timing error to a user equipment (UE) performing operations related to the DL-TDOA.

Other exemplary embodiments are related to a location management function (LMF) of a network configured to perform operations. The operations include receiving an indication of an effective timing error for an uplink time difference of arrival (UL-TDOA) positioning technique, wherein the effective timing error is associated with a set of base stations configured to receive positioning reference signals from a user equipment (UE) for the UL-TDOA and providing the effective timing error to at least one of the set of base stations performing operations related to the UL-TDOA.

Still further exemplary embodiments are related to a location management function (LMF) of a network configured to perform operations. The operations include receiving an indication of an effective timing error for a multi-round trip time (m-RTT) positioning technique, wherein the effective timing error is associated with at least one base station and a user equipment (UE) configured to transmit and receive positioning reference signals for the m-RTT and providing the effective timing error to one of the base station or the UE.

DETAILED DESCRIPTION

Figure 1:
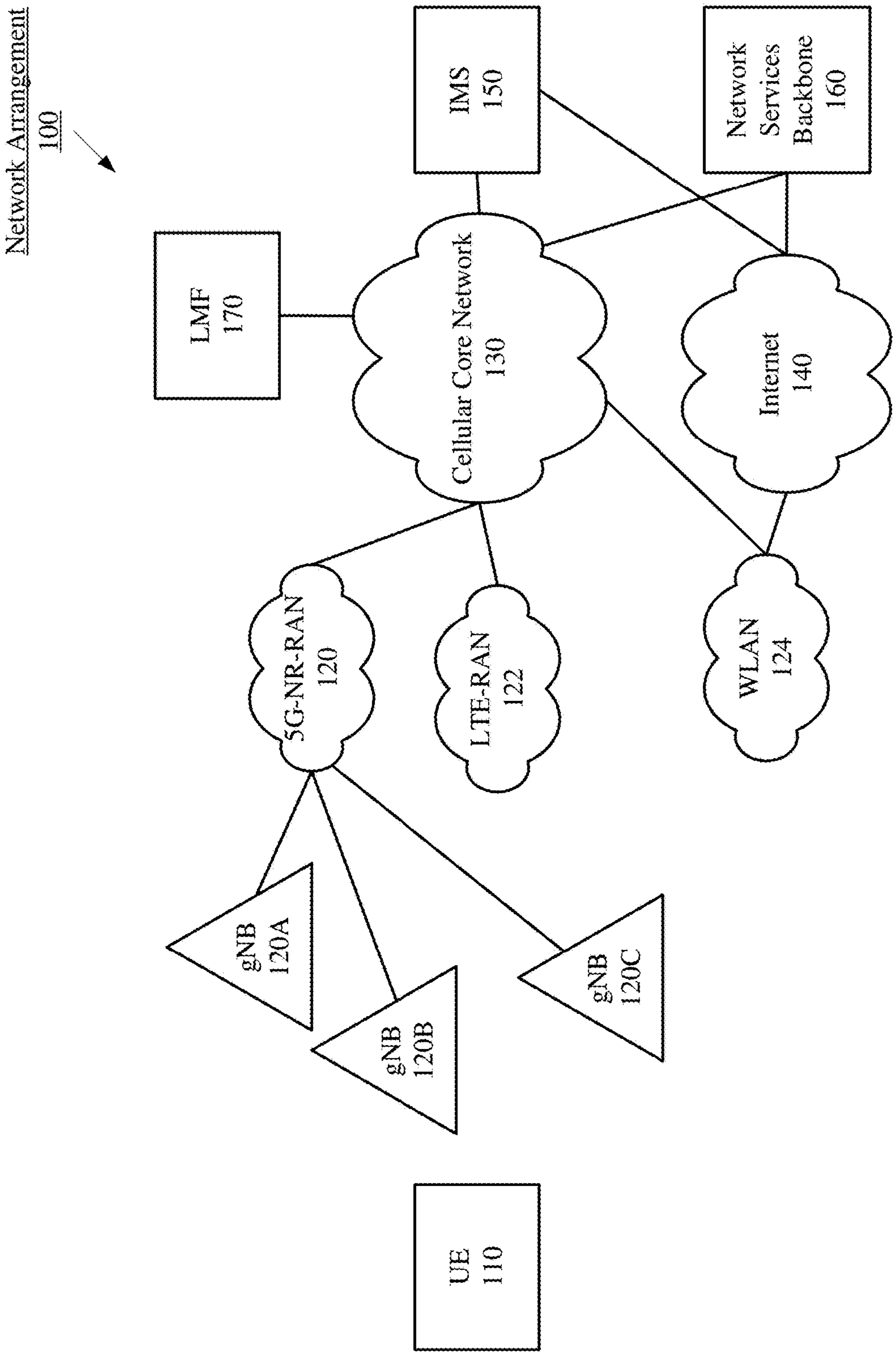
FIG. 1 shows a network arrangement according to various exemplary embodiments.

The exemplary embodiments may be further understood with reference to the following description and the related appended drawings, wherein like elements are provided with the same reference numerals. The exemplary embodiments describe operations related to improving positioning techniques for determining a physical location of a user equipment (UE).

The exemplary embodiments are described with regard to a UE. However, reference to a UE is merely provided for illustrative purposes. The exemplary embodiments may be utilized with any electronic component that may establish a connection to a network and is configured with the hardware, software, and/or firmware to exchange information and data with the network. Therefore, the UE as described herein is used to represent any appropriate electronic component.

In addition, the exemplary embodiments are described with regard to a 5G New Radio (NR) network. However, reference to a 5G NR network is merely provided for illustrative purposes. The exemplary embodiments may be utilized with any network that implements the functionalities described herein.

According to some exemplary embodiments described herein, various positioning techniques may be improved by accounting for timing errors associated with the devices (UE, gNB, network components, etc.) and/or signals used to perform the positioning operations. The improvements to the positioning techniques will be described with reference to examples of a downlink (DL) Time Difference of Arrival (DL-TDOA) technique, an uplink (UL) TDOA (UL-TDOA) and a multi-Round Trip Time (multi-RTT) technique. However, it should be understood that the exemplary operations described below may also be applied to other types of positioning techniques. In addition, various exemplary manners of signaling information among the devices performing the positioning operations are described.

FIG. 1 shows an exemplary network arrangement 100 according to various exemplary embodiments. The exemplary network arrangement 100 includes a user equipment (UE) 110. Those skilled in the art will understand that the UE may be any type of electronic component that is configured to communicate via a network, e.g., a component of a connected car, a mobile phone, a tablet computer, a smartphone, a phablet, an embedded device, a wearable, an Internet of Things (IoT) device, etc. It should also be understood that an actual network arrangement may include any number of UEs being used by any number of users. Thus, the example of a single UE 110 is merely provided for illustrative purposes.

The UE 110 may communicate directly with one or more networks. In the example of the network configuration 100, the networks with which the UE 110 may wirelessly communicate are a 5G NR radio access network (5G NR-RAN) 120, an LTE radio access network (LTE-RAN) 122 and a wireless local access network (WLAN) 124. Therefore, the UE 110 may include a 5G NR chipset to communicate with the 5G NR-RAN 120, an LTE chipset to communicate with the LTE-RAN 122 and an ISM chipset to communicate with the WLAN 124. However, the UE 110 may also communicate with other types of networks (e.g., legacy cellular networks) and the UE 110 may also communicate with networks over a wired connection. With regard to the exemplary embodiments, the UE 110 may establish a connection with the 5G NR-RAN 120.

The 5G NR-RAN 120 and the LTE-RAN 122 may be portions of cellular networks that may be deployed by cellular providers (e.g., Verizon, AT&T, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 124 may include any type of wireless local area network (WiFi, Hot Spot, IEEE 802.11x networks, etc.).

The UE 110 may connect to the 5G NR-RAN via at least one of the next generation nodeB (gNB) 120A, gNB 120B and/or the gNB 120C. In the examples described below, it may be considered that the gNB 120A-C are neighbor gNBs that may be used to perform positioning operations. The gNBs 120A, 120B and 120C may be configured with the necessary hardware (e.g., antenna array), software and/or firmware to perform massive multiple in multiple out (MIMO) functionality. Massive MIMO may refer to a base station that is configured to generate a plurality of beams for a plurality of UEs. Reference to three gNBs 120A-C is merely for illustrative purposes. The exemplary embodiments may apply to any appropriate number of gNBs.

In addition, throughout this description the terms gNB and transmission and reception point (TRP) may be used interchangeably. Specifically, the UE 110 may simultaneously connect to and exchange data with a plurality of gNBs (e.g., gNBs 120A-C) in a multi-TRP configuration. The connections to the gNBs 120A-C may be, for example, multi-TRP connections where the gNBs 120A-C provide services for the UE 110 on a same channel. This multi-TRP arrangement may also be used for positioning purposes as will be described in greater detail below.

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

FIG. 1 also shows location management function (LMF) 170. The LMF 170 may be considered a network component or function that is performing any network side operation related to the positioning techniques described herein. In the network arrangement 100 of FIG. 1, the LMF 170 is shown as being connected to the core network 130. However, the LMF 170 may be a separate component as shown in FIG. 1 that is connected to the core network 130 or the 5G NR RAN 120. In addition, the LMF 170 may be a network component or function that is resident within the core network 130 or the 5G NR RAN 120.

Figure 2:
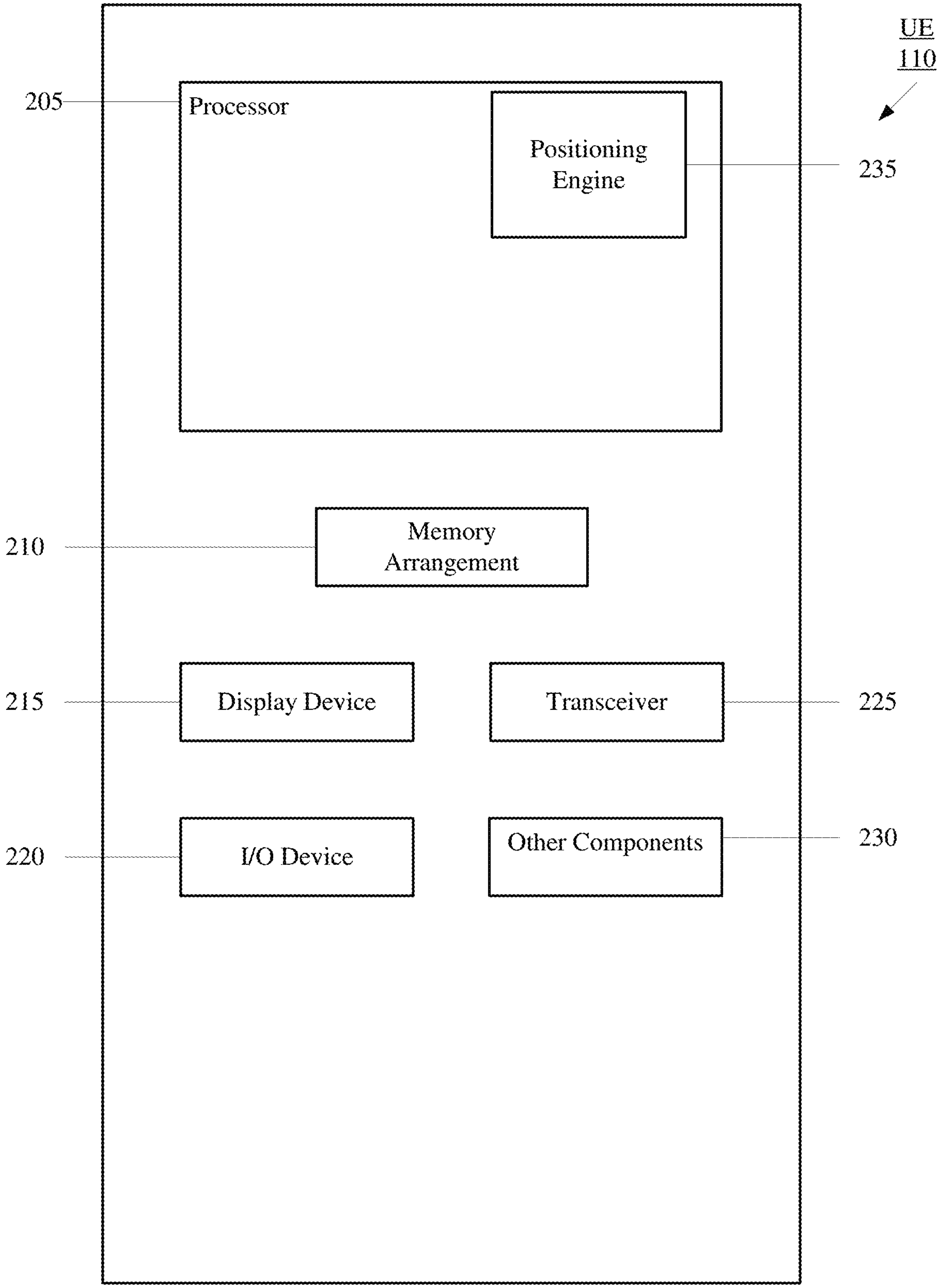
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225, and other components 230. The other components 230 may include, for example, an audio input device, an audio output device, a battery that provides a limited power supply, a data acquisition device, ports to electrically connect the UE 110 to other electronic devices, sensors to detect conditions of the UE 110, etc.

The processor 205 may be configured to execute a plurality of engines for the UE 110. For example, the engines may include a positioning engine 235. The positioning engine 235 may perform operations including receiving and measuring positioning reference signals, transmitting positioning reference signals, applying error corrections to positioning calculations, reporting positioning parameters to the network and/or the gNBs, etc. Exemplary operations performed by the UE 110 will be described in further detail below.

The above referenced engine being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE. The memory 210 may be a hardware component configured to store data related to operations performed by the UE 110.

The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G-NR RAN 120, the LTE RAN 122 etc. Accordingly, the transceiver 225 may operate on a variety of different frequencies or channels (e.g., set of consecutive frequencies).

Figure 3:
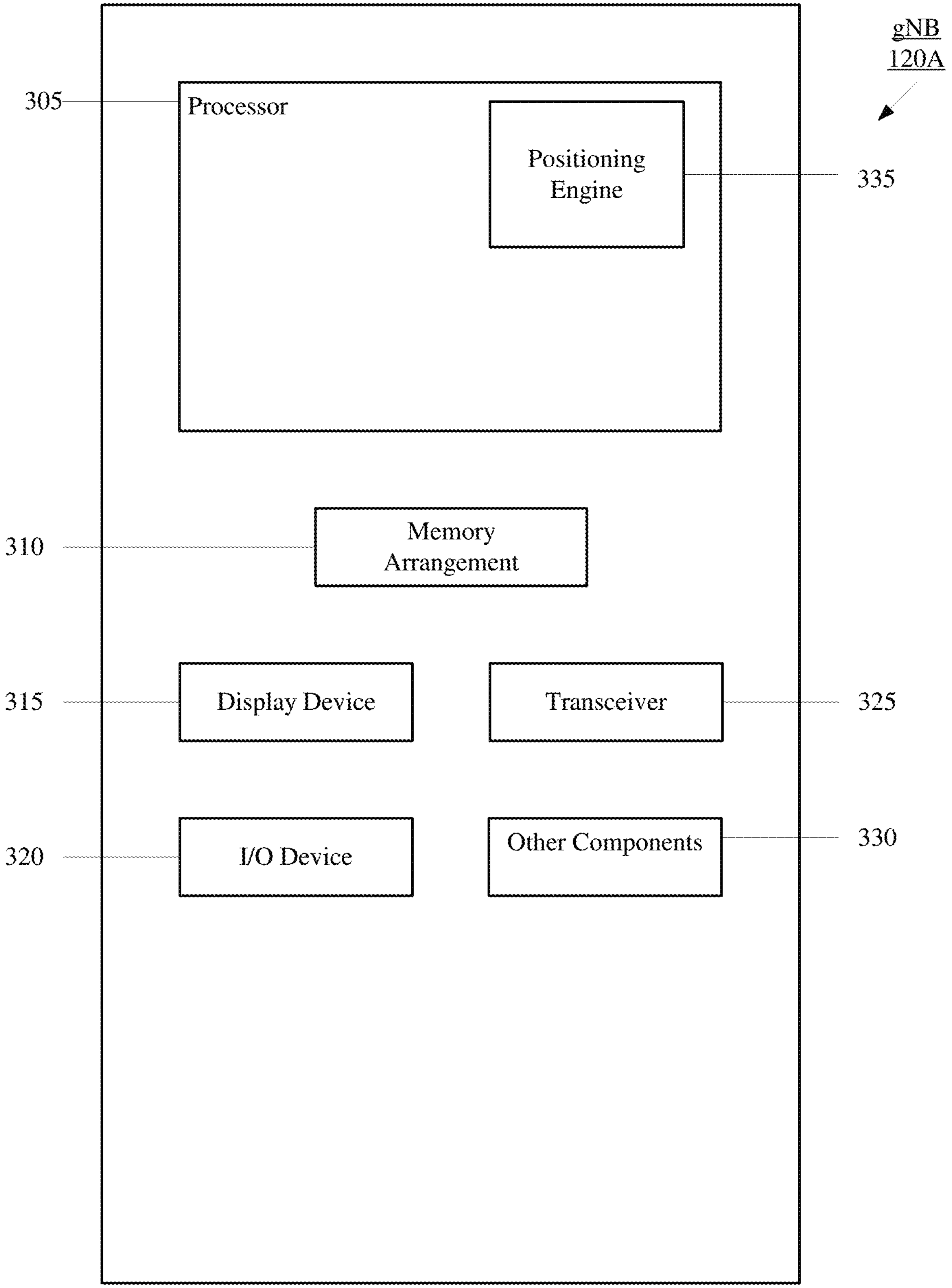
FIG. 3 shows an exemplary network cell according to various exemplary embodiments.

FIG. 3 shows an exemplary network cell, in this case gNB 120A, according to various exemplary embodiments. As noted above with regard to the UE 110, the gNB 120A may represent a cell in a multi-TRP configuration with the UE 110. The gNB 120A may represent any access node of the 5G NR network through which the UEs 110, 112 may establish a connection and manage network operations. The gNB 120A illustrated in FIG. 3 may also represent the gNBs 120B-C.

The gNB 120A may include a processor 305, a memory arrangement 310, an input/output (I/O) device 320, a transceiver 325, and other components 330. The other components 330 may include, for example, an audio input device, an audio output device, a battery, a data acquisition device, ports to electrically connect the gNB 120A to other electronic devices, etc.

The processor 305 may be configured to execute a plurality of engines of the gNB 120A. For example, the engines may include a positioning engine 335. The positioning engine 335 may perform operations including receiving and measuring positioning reference signals, transmitting positioning reference signals, applying error corrections to positioning calculations, reporting positioning parameters to the network and/or the UE 110, etc. Exemplary operations performed by the gNB will be described in further detail below.

The above noted engines each being an application (e.g., a program) executed by the processor 305 is only exemplary. The functionality associated with the engines may also be represented as a separate incorporated component of the gNB 120A or may be a modular component coupled to the gNB 120A, e.g., an integrated circuit with or without firmware. For example, the integrated circuit may include input circuitry to receive signals and processing circuitry to process the signals and other information. In addition, in some gNBs, the functionality described for the processor 305 is split among a plurality of processors (e.g., a baseband processor, an applications processor, etc.). The exemplary embodiments may be implemented in any of these or other configurations of a gNB.

The memory 310 may be a hardware component configured to store data related to operations performed by the gNB 120A. The I/O device 320 may be a hardware component or ports that enable a user to interact with the other devices. The transceiver 325 may be a hardware component configured to exchange data with the UE 110 and any other UE in the system 100. The transceiver 325 may operate on a variety of different frequencies or channels (e.g., set of consecutive frequencies). Therefore, the transceiver 325 may include one or more components (e.g., radios) to enable the data exchange with the various networks and UEs.

The exemplary embodiments may be used with multiple different types of position techniques. Examples of positioning techniques include a downlink (DL) Time Difference of Arrival (DL-TDOA) technique, an uplink (UL) TDOA (UL-TDOA) technique, a UL Angle of Arrival (UL-AOA) technique, a DL Angle of Departure (DL-AOD) technique and a multi-Round Trip Time (multi-RTT) technique. Those skilled in the art will understand that these positioning techniques are only exemplary, and the exemplary embodiments may be used with other types of positioning techniques.

In addition, throughout this description, it may be considered that there are two categories of each positioning technique. The first category is UE-based positioning techniques. UE-based positioning techniques generally include the UE performing the positioning calculations. The second category is UE-assisted positioning techniques. UE-assisted positioning techniques generally include a network component or function (e.g., LMF) performing the positioning calculations based on at least some information provided by the UE. It should be understood that the exemplary embodiments may be applied to either UE-based or UE-assisted positioning techniques. The below description will identify any differences in implementing the exemplary embodiments in the different categories of positioning techniques.

Furthermore, in each of FIGS. 4-7 and 8*b*, three gNBs and a UE are illustrated. It may be considered that the gNBs include the functionality of the gNBs 120A-C described above. In addition, the UE may include the functionality of the gNBs 120A-C described above.

Figure 4:
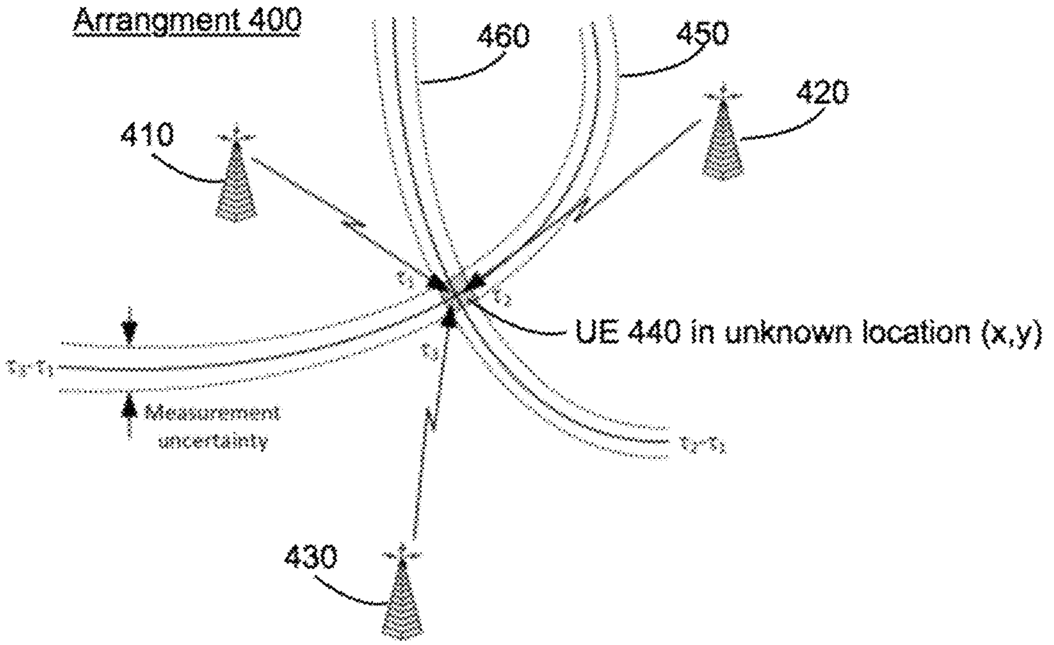
FIG. 4 shows an example of a downlink (DL) Time Difference of Arrival (DL-TDOA) positioning technique according to various exemplary embodiments.

FIG. 4 shows an example of a downlink (DL) Time Difference of Arrival (DL-TDOA) positioning technique according to various exemplary embodiments. FIG. 4 shows an arrangement 400 including three gNBs (or transmission and reception points (TRPs)) 410-430 and a UE 440 in a location. To perform DL-TDOA, the multiple gNBs 410-430 transmit positioning reference signals (PRS). The UE 440 makes time of arrival (TOA) measurements for the reference signals received from each of the multiple gNBs 410-430. The UE 440 calculates TDOAs from each gNB 410-430 by subtracting the TOA of a reference gNB from the observed TOAs from each gNB 410-430. Geometrically, the received signal time differences (RSTD) with respect to two gNBs determines a hyperbola between the two gNBs, e.g., the hyperbolas 450 and 460. A point where these hyperbolas 450 and 460 intersect is the location of the UE 440.

In the following description of the gNBs transmitting PRS, it will be considered that the gNB 410 and the gNB 420 are transmitting PRS for the purposes of DL-TDOA. However, it should be understood that the gNB 430 may perform any of the operations described herein for gNBs 410 and 420.

There may be timing errors that are introduced when performing the DL-TDOA. The timing errors may include a synchronization error between the UE and the gNBs and/or between the gNBs. For example, the gNBs 410 and 420 may be configured to transmit the PRSs at the same time. However, in actual operation, it is unlikely that the gNB 410 and gNB 420 are perfectly synchronized. Thus, there is a synchronization error between the gNB 410 and gNB 420. This synchronization error may be defined as (D). In the example of DL-TDOA, there is no synchronization error associated with the UE because any synchronization error would be cancelled based on the RSTD measurement.

The timing errors may also include a group timing delay that comprises a delay from the radio frequency (RF) component of the device to the baseband of the device in reception and/or transmission. This group timing delay is introduced independently at the UE and the gNBs, where for either the UE and/or the gNBs, the reception and transmission errors may be different. In the example, of DL-TDOA, there is no group delay associated with the UE because the UE will be processing the PRS received from both the gNB 410 and the gNB 420 and this processing should take the same amount of time. On the other hand, each of gNB 410 and gNB 420 will introduce their own group timing transmission delay when transmitting the PRS. These group timing transmission delays may be defined as ($d_1$) for the gNB 410 and ($d_2$) for the gNB 420.

In a TDOA calculation, the RSTD may be calculated as follows:

$$\text{RSTD}=t_1-t_2+d_1-d_2-D,$$

where, $t_1$=the ideal time of arrival of the PRS from the first gNB, and $t_2$=the ideal time of arrival of the PRS from the second gNB.

Thus, as can be seen from the above equation, the effective timing error (e) associated with the transmission of the PRS by the gNBs 410 and 420 and the reception of the PRS by the UE 440 may be considered to be $e=d_1-d_2-D$. To have accurate positioning information, these timing errors must be handled when making the positioning calculations. The exemplary embodiments provide multiple manners of handling the timing errors associated with the various positioning techniques. As noted above, the timing errors are not identical for each of the exemplary positioning techniques and any differences in the contributions to the effective timing error for a positioning technique will be described herein.

In some exemplary embodiments, a UE with a known position may be introduced and RSTD measurements from this UE are compared against the ideal measurement. This difference shows the effective timing error (e) that needs to be corrected, e.g., by making the RSTD measurements from the known location and comparing these actual measurements to the ideal measurements that should be from the known location, the effective timing error (e) becomes a known value. This known value may then be accounted for when performing the positioning calculations. However, this known value of (e) needs to be signaled to the component performing the positioning calculations and/or making the positioning measurements, e.g., the UE 440, one of the gNBs 410-430 and/or the LMF 170.

In some exemplary embodiments for DL-TDOA, the LMF 170 will receive and store the known value of (e) for individual locations. The LMF will provide the known value of (e) to the UE 440 via a LTE Position Protocol (LPP) message, e.g., the LPP message Provide Assistance Data. Currently the information provided in the Provide Assistance Data message is defined in 3GPP 38.305 Table 8.12.2.1-1. A new field may be added to this table to further provide the known value of (e). The known value of (e) may be associated with a time stamp that indicates when the error value is valid and/or when the error value should be applied. The effective error may be absolute or accumulated, e.g., in respect to the previous provided value for the effective timing error. This manner of providing the known value of (e) to the UE 440 may be used for either UE-based or US-assisted positioning.

Each known value of (e) may be associated with a set of gNB (or TRP) IDs of candidate gNBs for measurement. Thus, the UE 440 may apply the known value of (e) to the RSTD measurements reported for that set of gNBs. Thus, in some exemplary embodiments, the UE 440 may provide the RSTD measurements to the LMF 170 with the correction for the known value of (e). The LMF 170 may then perform the positioning calculations using the corrected RSTD measurements, e.g., UE-assisted DL-TDOA.

In other exemplary embodiments, the LMF 170 may instruct the gNBs (e.g., gNBs 410-430) to broadcast the effective timing error within a System Information Block (SIB), e.g., posSIB. This type of signaling may reduce network overhead as each individual UE does not need to be signaled.

In some exemplary embodiments of DL-TDOA, the UE 440 may select whether to apply the effective timing error to the position calculations. The UE 440 may indicate to the LMF 170 whether the effective timing error is applied to calculate the position or not, e.g., via an LPP message such as Provide Location Information. For example, when the UE 440 performs UE-based positioning and provides the LMF 170 with the calculated position, the UE 440 may indicate whether the calculated position accounted for the known value of (e). In other exemplary embodiments, the UE 440 may not have a choice and may be required to apply the effective timing error in positioning calculations if a known value of (e) was provided by the LMF 170.

In some exemplary embodiments of DL-TDOA, the LMF 170 may not provide the effective timing error to the UE 440 when UE-assisted DL-TDOA is being used. In these exemplary embodiments, the LMF 170 applies the error when the LMF 170 is performing the position calculations.

In the above described exemplary embodiments of US-assisted DL-TDOA, it was considered that the LMF 170 did not provide the effective timing error to the UE 440. However, this may not be a guarantee that the UE 440 has not previously stored the effective timing error, e.g., the UE 440 may have information about the effective timing error from previous measurements such as if the UE 440 were in a previous UE-based mode. Thus, in some exemplary embodiments, the UE 440 may still signal the LMF 170 whether or not the effective timing error was considered when performing and reporting the RSTD measurements, even if the LMF 170 does not expect the UE 440 to have the effective timing error information. The UE may indicate to the LMF 170 whether the effective timing error was considered via an LPP message, e.g., Provide Location Information message. If the effective timing error was considered, the indication may further include the error value that was applied to the positioning measurements. This type of reporting may also be applied to UE-based DL-TDOA positioning measurements to ensure that the UE 440 applied the correct effective timing error.

In other exemplary embodiments of DL-TDOA, the network may not have a reference UE to use to calculate the known value of (e). Thus, other manners of calculating the effective timing error may be used. These other manners of calculating effective timing error may include comparing the results of two different positioning techniques. For example, DL-TDOA results may be compared with a DL Angle of Departure (DL-AOD) results. As will be described in greater detail below, the comparison of the DL-TDOA results and the DL-AOD results will provide the network, e.g., the LMF 170 with a known value of the effective timing error. The network may then provide this known value of the effective timing error to UEs to perform DL-TDOA measurements and/or positioning calculations. Prior to describing, the exemplary embodiments related to comparing the results of the two different techniques to determine the effective timing error, a brief overview of DL-AOD will be provided.

Figure 5:
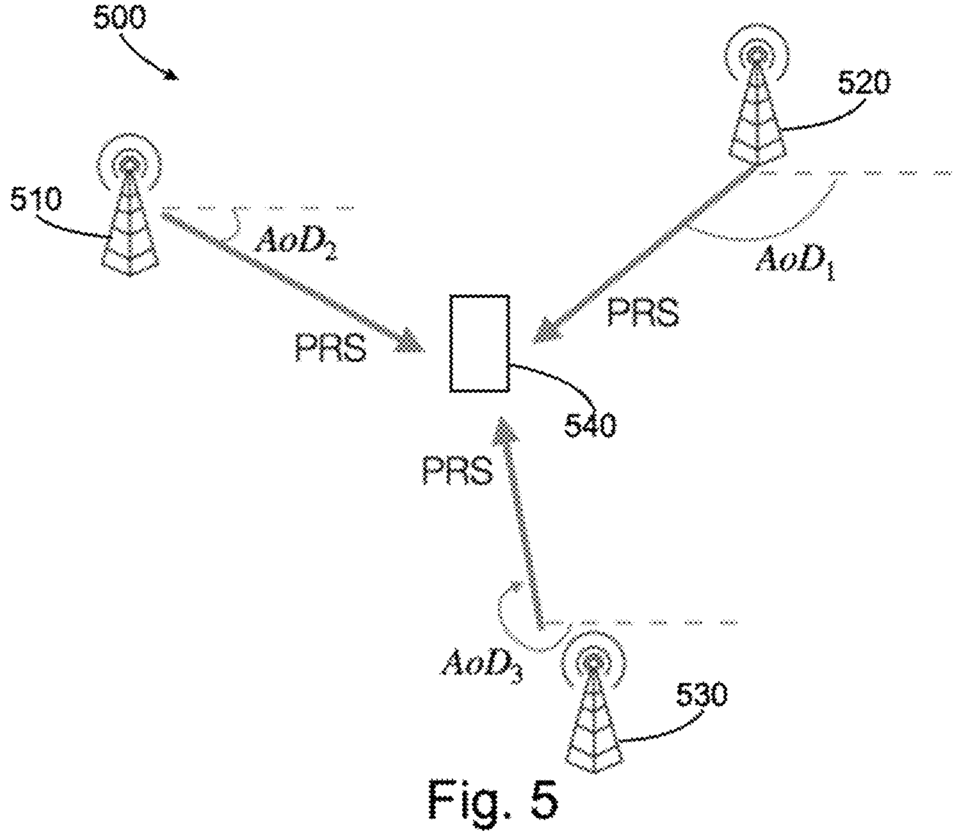
FIG. 5 shows an example of a downlink (DL) Angle of Departure (DL-AOD) positioning technique according to various exemplary embodiments.

FIG. 5 shows an example of a downlink (DL) Angle of Departure (DL-AOD) positioning technique according to various exemplary embodiments. FIG. 5 shows an arrangement 500 including three gNBs (or TRPs) 510-530 and a UE 540 in a location. To perform DL-AOD, the multiple gNBs 410-430 transmit DL-PRS with transmission beam sweeping. The UE 540 measures the DL-PRS Received Signal Reference Power (RSRP) using a fixed reference beam. The UE 540 may then report the DL-PRS RSRPs to network, e.g., the LMF 170. The network may then use this information to calculate the DL-AOD of azimuth and zenith. The network may then calculate the location of the UE 540 using this information and the known locations of the gNBs.

The angle-based positioning technique is more robust to timing errors. Thus, DL-AOD should optimally result $t_1-t_2$, where $t_1$ and $t_2$ is the arrival time of the DL-PRS of two gNBs respectively. As described above the DL-TDOA calculation is based on $RSTD=t_1-t_2-d_1-d_2-D$. It may then be considered that the difference between the two results (DL-AOD—DL-TDOA) is $d_1-d_2-D$ or the effective timing error (e) as described above. Thus, the difference between the results of the two measurements may be used to determine the effective timing error.

To perform the comparison between the DL-AOD and DL-TDOA results, the UE may be signaled to perform the measurements for both positioning techniques. The indication may be implicit, e.g., if assistance data provided by the LMF 170 supports all required fields for both positioning techniques, the UE may then perform the measurements for both positioning techniques. The indication may also be explicit, e.g., through an LPP message such as the Provide Assistance Data message or the Request Location Information message.

The measurements may at least include the DL-RSTD together with DL-PRS-RSRP over a set of TRPs, antenna panels, PRS configurations, etc. In addition, for UE-based positioning techniques, the UE may have additional capabilities, such as, a number of PRS symbols processed in a time duration, once UE is indicated to perform concurrent positioning based on both DL-TDOA and DL-AOD positioning techniques.

In some exemplary embodiments, to calculate the effective timing error, the LMF 170 may indicate to the gNB to provide panel and spatial direction information that is used to transmit the PRS. This information is used to ensure that the effective timing error that will be later be captured by the combination of DL-AOD and DL-TDOA measurements is applicable to appropriate panels and filters. The indication from the LMF 170 to the gNBs may be provided via a NR Positioning Protocol A (NRPPa) TRP Information Request message. While the spatial direction information of the DL-PRS of a gNB is already specified, the exemplary embodiments use the gNB to provide the information via an NRPPa TRP Information Response message. This information may be added as a new field to the NRPPa TRP Information Response message that is in 3GPP TS 38.305 Table 8.12.2.3-1.

In other exemplary embodiments, to calculate the effective timing error, the LMF 170 may indicate to the UE the panel ID and/or spatial direction information that gNB used to transmit the PRS. This information may be used to tag each PRS measurement at the UE with the corresponding TRP panel. Again, the LMF 170 may provide this indication via an LPP Information Provide Assistance Data message. For UE-assisted positioning techniques, the indication may further include requesting the UE to report back the TRP panel ID associated with the DL-PRS-RSPR and DL-RSTD measurements at the UE.

Thus, the UE will report the measurements for the DL-TDOA, DL-AOD and for a set of TRPs, panels, and spatial direction. The LMF 170 may then calculate the effective timing error that is associated with the same set of TRP IDs, Panel IDs, and spatial directions. Once the effective timing error is available at the LMF 170 for a set of TRP IDs, panel IDs and/or spatial directions, the LMF 170 can report the value for the effective timing error to other UEs measuring DL-TDOA on the same set of TRP IDs and the same set of TRP panels. Various manners of reporting the known value of the effective timing error to UEs was described above and any of these manners may also be used to report the known value of the effective timing error calculated in accordance with the above described exemplary embodiments. In addition, the below manners of reporting the effective timing error to UEs may also be used.

In some exemplary embodiments, for UE-based DL-TDOA, the LMF 170 may indicate the effective timing error as well as the TRP IDs and the panel IDs, for which the effective timing error is valid/calculated to UEs. In one example, the indication to the UEs may be via the LPP message Provide Assistance Data. In another example, the indication may be via a SIB broadcast by the gNB, e.g., PosSIB. UEs may apply the effective timing error if the measurements is over PRS receptions from the TRP IDs and panel IDs associated with the effective timing error. However, this is not a requirement, there may be TRP IDs and panel IDs that have the same general characteristics as the reported TRP IDs and panel IDs. The effective timing error may also be applied to measurements for these types of TRP IDs and panel IDs.

In other exemplary embodiments, for a given effective timing error associated with a set of TRP IDs and panel IDs, the LMF 170 may request the TRPs to transmit PRS on specific panel IDs associated with the effective timing error. To provide this information to the gNBs, a new NRPPa message for DL-TDOA may be introduced, or the Positioning Information Request message may be reused. The serving gNB and corresponding TRPs may then use transmit PRS on panel IDs/spatial directions requested by the LMF 170.

Figure 6:
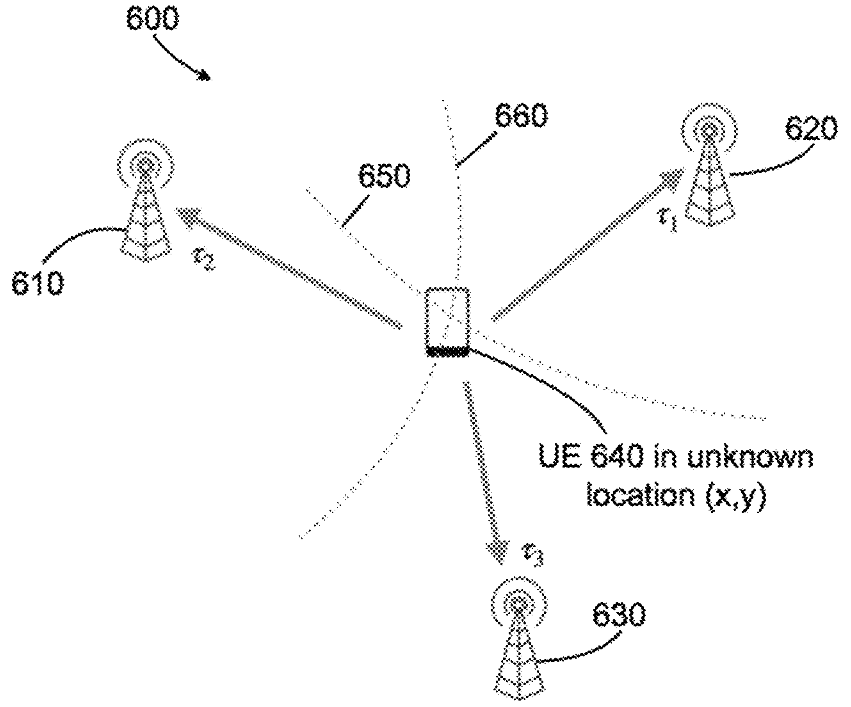
FIG. 6 shows an example of an uplink (UL) Time Difference of Arrival (UL-TDOA) positioning technique according to various exemplary embodiments.

FIG. 6 shows an example of an uplink (UL) Time Difference of Arrival (UL-TDOA) positioning technique according to various exemplary embodiments. FIG. 6 shows an arrangement 600 including three gNBs (or transmission and reception points (TRPs)) 610-630 and a UE 640 in a location. To perform UL-TDOA, the UE 640 transmits sounding reference signals (SRS) that may be received by two or more of the gNBs 610-630. As with the example above of DL-TDOA, the UL-TDOA positioning technique will be described with reference to the gNBs 610 and 620 receiving the SRS but it should be understood that gNB 630 may perform the same operations as described for gNBs 610 and 620. The gNBs 610 and 620 receive the SRS and measure the time of arrival (TOA) of the SRS. The gNBs may then calculate a relative TOA (RTOA) by subtracting the TOA measured at a reference gNB from other TOAs. Geometrically, RTOA between the two gNBs determines hyperbolas 650-660 between the gNBs. The point where the hyperbolas 650 and 660 intersect is the location of the UE 640.

The UL-TDOA has the same formula for the effective timing error, i.e., $e=d_1-d_2-D$, as DL TDOA. The D in this equation is the same synchronization error between the two gNBs as was described above. However, the group timing delay ($d_1$ and $d_2$) is now associated with the group timing reception delay each of gNB 410 and gNB 420 (rather than the group timing transmission delay in DL-TDOA).

Similar to DL-TDOA, in some exemplary embodiments of UL-TDOA, a UE with a known position may be introduced and RTOA measurements based on this UE transmitting SRS are compared against the ideal measurement. This difference shows the effective timing error (e) that needs to be corrected. This known value may then be accounted for when performing the positioning calculations. This effective timing error may be stored by the LMF 170. As will be described in greater detail below, the LMF 170 may then report the effective timing error to the gNBs. Similar to the effective timing error that is reported in DL-TDOA, the effective timing error for UL-TDOA may include a time stamp indicating a time for which the effective timing error value is valid. In addition, the effective timing error may be accumulative or absolute.

In some exemplary embodiments, the LMF 170 provides the effective timing error to selected gNBs in a NRPPa Measurement Request message. The gNB with an identification included in the Measurement Request message may apply the effective timing error to its UL-RTOA measurement and report the corrected RTOA to the LMF 170. If no specific gNB is identified in the Measurement Request message, the gNB that applies the effective timing error to the RTOA may be implicitly signaled as, for example, the serving gNB, the first or last gNB within the set of gNBs. Thus, in this example, it is considered that only one of the gNBs of the set of gNBs will report the corrected RTOA.

In other exemplary embodiments, the LMF 170 may provide the effective timing error through a NRPPa Positioning Information Request message to the serving gNB. In this case, only the serving gNB would apply the effective timing error to its UL-RTOA measurements and report the corrected RTOA to the LMF 170.

In still further exemplary embodiments, the LMF 170 does not provide the effective timing error to the gNBs. Rather, when the LMF 170 receives the RTOA measurements from the gNBs, the LMF 170 applies the error when performing the positioning calculations.

In some exemplary embodiments of UL-TDOA, the timing error that is provided is not the complete effective timing error as described above but is a partial effective timing error. When a gNB is a receiver (e.g., of the SRS from the UE), the individual gNB may be able to estimate and correct its group timing reception delay. The gNB may apply this self correction to the measured RTOA. Thus, the LMF 170 may only provide the synchronization error (D) to the gNB (e.g., the partial effective timing error) for further correction of the RTOA. It should be understood that for UL-TDOA, the receiving devices (e.g., the gNBs) may estimate their receiving group delay (e.g., $d_1$ and $d_2$). Thus, when $d_1-d_2+D$ is known based on the reference UE, D becomes a known value that the LMF 170 may report to the gNBs.

The reporting and application of the partial effective timing error may be performed in the same manners as described above for the effective timing error, e.g., NRPPa Measurement Request message, NRPPa Positioning Information Request message, etc. The gNB implicitly or explicitly identified in the message (e.g., by ID, as the serving cell, as the first or last cell in the list, etc.) may apply the partial effective timing error in its report to the LMF 170, (e.g., in addition to the already applied individual group timing reception delay). As described above, in some exemplary embodiments, the LMF 170 may not provide the partial effective timing error to the gNBs but may apply the synchronization error (D) between gNBs when performing the positioning calculations using the partially corrected RTOAs received from the gNBs.

In some exemplary embodiments, when the gNB reports the RTOA, the gNB may indicate whether the effective timing error or the partial effective timing error (e.g., group timing delay) was used to correct the RTOA. The indication may be provided via a NRPPa Measurement Response message. In other exemplary embodiments, when the LMF 170 reports the effective timing error or the partial effective timing error to the 5G NR-RAN 120, the LMF 170 may assume that the indicated error was accounted for in the reported RTOA measurements.

As described above with respect to DL-TDOA, the effective timing error (e) for UL-TDOA may also be determined by comparing UL-TDOA positioning results with the results of other types of positioning techniques. In some exemplary embodiments, the other type of positioning techniques may be a UL Angle of Arrival (UL-AOA) technique. As will be described in greater detail below, the comparison of the UL-TDOA results and the UL-AOA results will provide the network, e.g., the LMF 170 with a known value of the effective timing error. The network may then provide this known value of the effective timing error to gNBs to perform UL-TDOA measurements and/or positioning calculations. Prior to describing, the exemplary embodiments related to comparing the results of the two different techniques to determine the effective timing error, a brief overview of UL-AOA will be provided.

Figure 7:
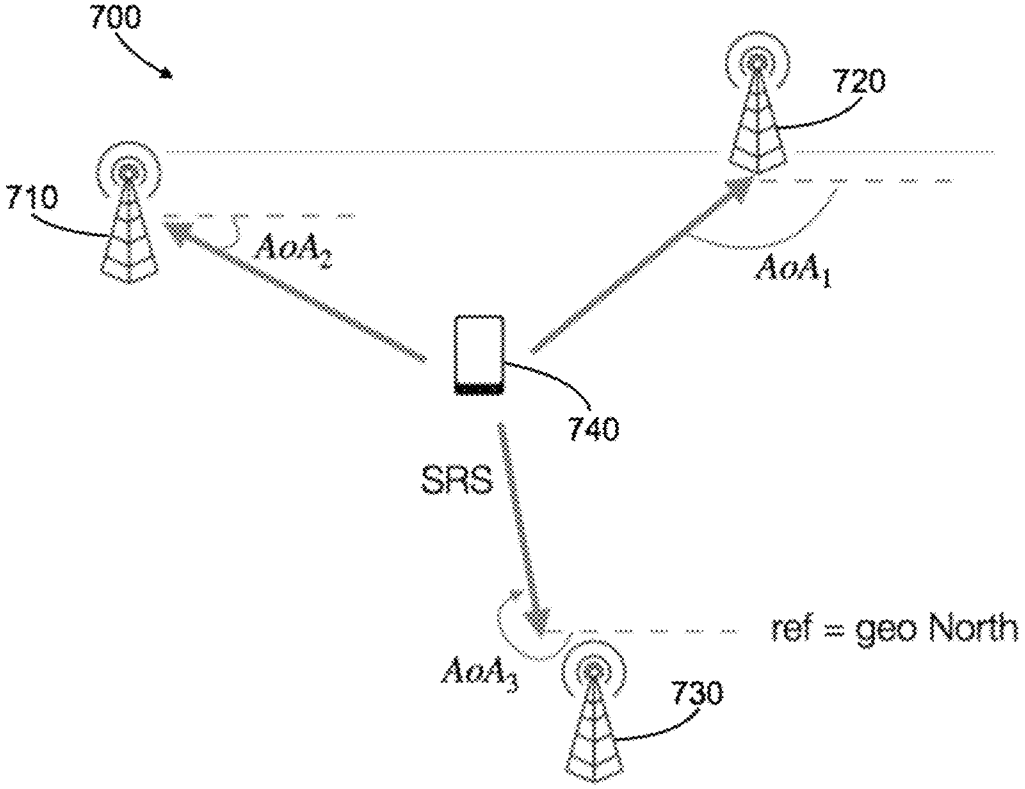
FIG. 7 shows an example of an uplink (UL) Angle of Arrival (UL-AOA) positioning technique according to various exemplary embodiments.

FIG. 7 shows an example of an uplink (UL) Angle of Arrival (UL-AOA) positioning technique according to various exemplary embodiments. FIG. 7 shows an arrangement 700 including three gNBs (or TRPs) 710-730 and a UE 740 in a location. To perform UL-AOA, the UE 740 transmits SRS using a fixed reference beam. The gNBs 710-730 measures the SRS RSRP using reception beam sweeping. The gNBs 710-730 may then report the SRS RSRPs to network, e.g., the LMF 170. The network may then use this information to calculate the UL-AOA of azimuth and zenith. The network may then calculate the location of the UE 740 using this information and the known locations of the gNBs.

The angle-based positioning technique is more robust to timing errors. Thus, UL-AOA should optimally result $t_1-t_2$, where $t_1$ and $t_2$ is the arrival time of the UL-SRS at the two gNBs, respectively. As described above the UL-TDOA calculation is based on $RTOA=t_1-t_2-d_1-d_2-D$. It may then be considered that the difference between the two results (UL-AOA−UL-TDOA) is $d_1-d_2-D$ or the effective timing error (e) as described above. Thus, the difference between the results of the two measurements may be used to determine the effective timing error.

To perform the comparison between the UL-AOA and UL-TDOA results, the gNBs may be signaled to perform the measurements for both positioning techniques. The measurements may at least include the UL-RTOA together with UL-SRS-RSRP over a set of TRPs, antenna panels, PRS configurations, etc.

In some exemplary embodiments, to calculate the effective timing error, the LMF 170 may indicate to the gNBs to provide panel and spatial direction information that is used to receive the PRS. This information is used to ensure that the effective timing error that will be later be captured by the combination of UL-AOA and UL-TDOA measurements is applicable to appropriate panels and filters. The indication from the LMF 170 to the gNBs may be provided via a new field for panel ID in the NRPPa TRP Information Request message. Thus, the LMF 170 will know UE's position through both UL-TDOA and UL-AoA techniques, obtained based on measurements made by a set of (TRPs, panels, spatial direction). This means the calculated effective timing error is applicable to the same set of (TRP IDs, Panel IDs, spatial directions), when used to measure position of other UEs using the UL-TDOA.

In some exemplary embodiments of UL-TDOA, the LMF 170 may indicate the effective timing error as well as the TRP IDs and the panel IDs, for which the effective timing error is valid/calculated to the gNBs. In one example, the indication to the gNBs may be via the NRPPa Positioning Information Request message. The gNBs may then receive the SRS on panel IDs requested by the LMF 170 and apply the effective timing error. However, this is not a requirement, there may be TRP IDs and panel IDs that have the same general characteristics as the reported TRP IDs and panel IDs. The effective timing error may also be applied to measurements for these types of TRP IDs and panel IDs.

Figure 8A:
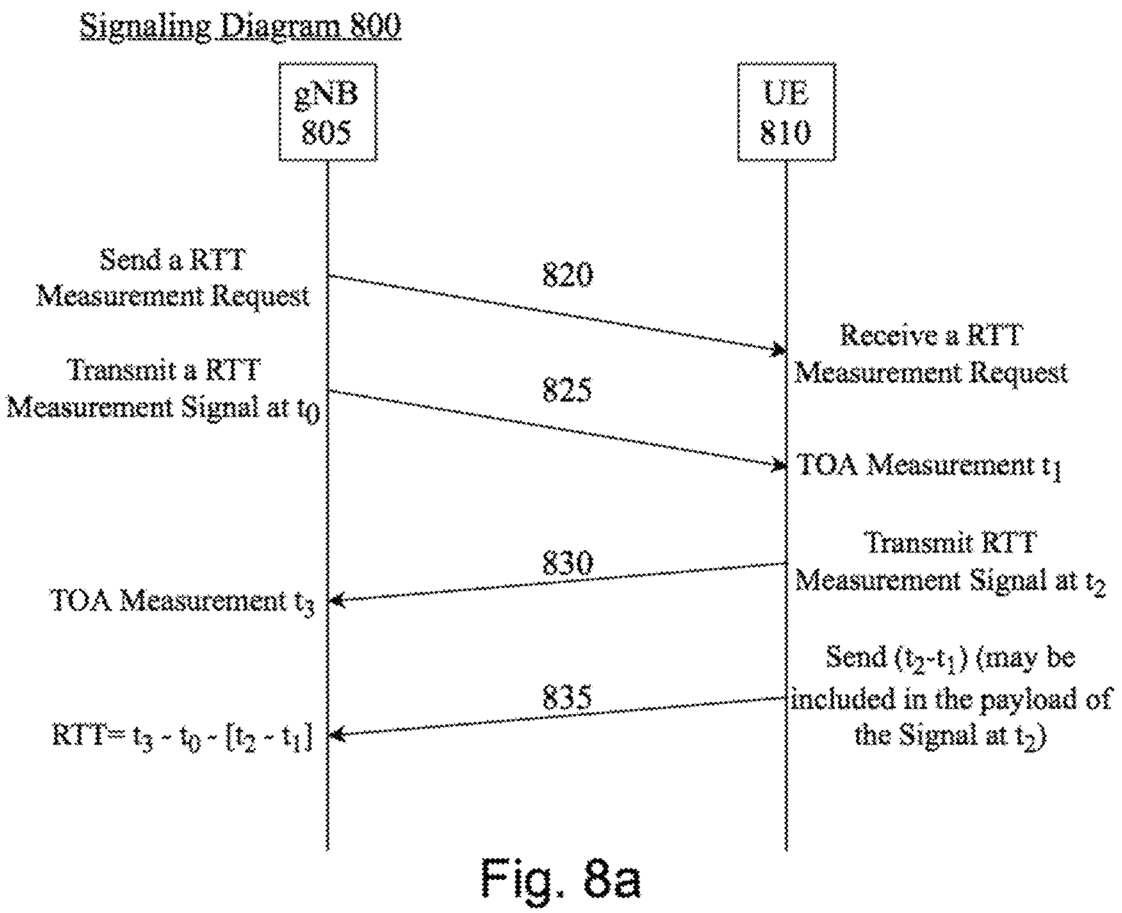
FIGS. 8*a* and 8*b* show an example of a multi-Round Trip Time (multi-RTT) positioning technique according to various exemplary embodiments.

FIGS. **8*a* and 8*b* show an example of a multi-Round Trip Time (multi-RTT) positioning technique according to various exemplary embodiments. The advantage of the multi- RTT positioning technique is that it does not require stringent synchronization among the gNBs. The initiating device may be a gNB or a UE. FIG. 8***a* shows an exemplary signaling diagram 800 for a multi-RTT positioning technique. In the example of FIG. 8*a*, it may be considered that the gNB 805 is the initiating device and the UE 810 is the responding device. In 820, the gNB 805 sends a control signal to the UE 810 to indicate that one or more gNBs will be transmitting RTT measurement signals in the DL. In 825 at t0, the gNB 805 transmits the RTT measurement signals and the UE 810 measures the TOA (e.g., t1) relative to its own timing. In 830, the UE 810 sends a UL RTT measurement signal at t2 and the gNB 805 measures the TOA at t3. In 835, the UE may also send an indication of t2−t1. In some exemplary embodiments, the indication of t2−t1 may be sent in the RTT measurement signal of 830. The gNB 805 may then calculate the RTT as t3−t0−(t2−t1).

Figure 8B:
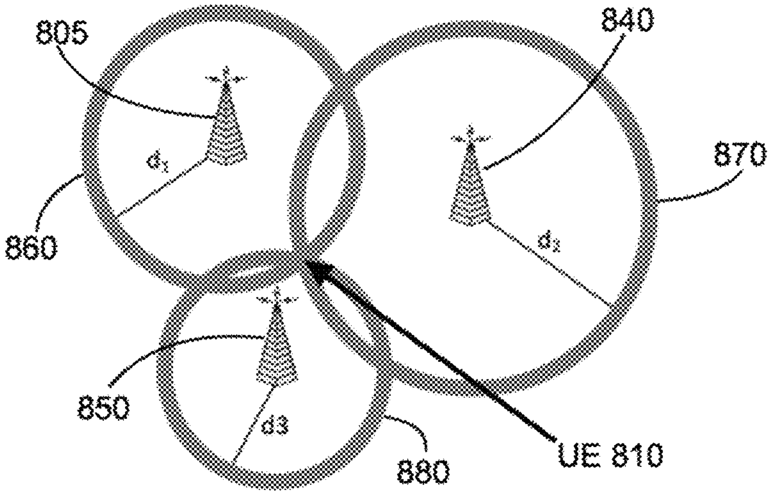

The RTT may then be used to compute a distance from the UE to the gNB. Since the RTT procedure does not include any directional information, the UE may be located anywhere on a circle having a radius of the distance around the gNB. FIG. 8*b* shows three gNBs 805, 840, 850 and the UE 810. As shown in FIG. 8*b*, the UE 810 may be located anywhere on the circle 860 having a radius of the distance ($d_1$) calculated based on the RTT described above.

The RTT procedure may be performed by all gNBs in the neighborhood to measure precisely the observed TOAs. Thus, the gNBs 840 and 850 may perform their own RTT procedure and calculate the distances, $d_2$ and $d_3$, respectively. Thus, as shown in FIG. 8*b*, the UE 810 may be located anywhere on the circle 870 having a radius of the distance ($d_2$) from the gNB 840 and the circle 880 having a radius of the distance ($d_3$) from the gNB 850. The actual location of the UE 810 may then be determined based on multilateration, e.g., the intersection of the three circles 860-880.

Unlike the TDOA positioning techniques described above, the synchronization error between devices, e.g., UE and gNB, is irrelevant for the multi-RTT positioning technique. Rather, since both devices are performing both transmissions and reception, the group error delay for both transmission and reception, for both devices is the major contributor to the timing errors for multi-RTT. Thus, it may be considered that the contributors to the timing errors are the timing delay at the UE for reception ($d_{UE\text{-}RX}$) and transmission ($d_{UE\text{-}TX}$) and at the gNB for reception ($d_{gNB\text{-}RX}$) and transmission ($d_{gNB\text{-}TX}$). Mathematically, the effective timing error (e) for multi-RTT may be defined as:

$$e=\tfrac{1}{2}(d_{UE\text{-}RX}+d_{UE\text{-}TX}+d_{gNB\text{-}RX}+d_{gNB\text{-}TX})$$

If it is considered that the timing delay is the same at transmission and reception, then:

$$e=d_{UE}+d_{gNB}$$

In some exemplary embodiments, the LMF 170 may provide the effective timing error to each gNB. For example, the effective timing error may be provided in a NRPPa Measurement Request message. The gNB may apply the effective timing error to the gNB Rx-Tx time difference measurement reports to the LMF 170 when the effective timing error is indicated by LMF 170 to the gNB.

In some exemplary embodiments, the LMF 170 may provide the effective timing error to the UE. For example, the effective timing error may be provided in the LPP message Provide Assistance Data. The UE may apply the effective timing error to the UE Rx-Tx time difference measurement reports to the LMF 170 when the effective timing error is indicated by the LMF 170 to the UE.

In some exemplary embodiments, the LMF 170 provides only part of the timing error. For example, in some exemplary embodiments, the LMF 170 may provide the UE transmission group delay ($d_{UE\text{-}TX}$) to the UE and the gNB transmission group delay ($d_{gNB\text{-}TX}$) to the gNB. This information may be provided to the UE and the gNB in, for example, the messages described above for the full effective timing error. In this example, it may be considered that the UE and the gNB are able to estimate and correct the corresponding reception group delay. Thus, the UE and the gNB will apply the corresponding partial effective timing error comprising the transmission group delays when reporting the time difference measurements to the LMF 170.

In another example, the LMF 170 provides a sum of the transmission group delay at the gNB and the reception group delay at the UE to the UE. Again, this may be indicated via the LPP message Provide Assistance Data. Similarly, the LMF 170 may provide a sum of the transmission group delay at UE and the reception group delay at the gNB to the gNB, e.g., via the NRPPa Measurement Request message. The UE and the gNB may then apply these corresponding partial effective timing errors when reporting the time difference measurements to the LMF 170.

In some exemplary embodiments, the UE and/or the gNB may indicate in the respective Rx-Tx time difference measurement report, whether any timing error correction, indicated by LMF 170 or not, has been applied to the reported time difference measurements.

In some exemplary embodiments, the gNB may configure each PRS with its associated group delay for PRS transmission and configure each SRS with the associated group delay for SRS reception. In some exemplary embodiments, the gNB may not change the panel/filters such that the group delay for PRS transmission (or SRS reception) becomes different than the configured ones. In other exemplary embodiments, the gNB may change the panel/filters as long as $d_{gNB\text{-}RX}+d_{gNB\text{-}TX}$ is fixed.

In one example, the gNB may indicate, to the LMF 170, the values for ($d_{gNB\text{-}RX}+d_{gNB\text{-}TX}$), $d_{gNB\text{-}RX}$, and/or $d_{gNB\text{-}TX}$ via a NRPPa message, e.g., TRP Information Response, Positioning Information Response, TRP Measurement Response, etc. The indication may include the reported delays and whether the reported values are applied in the reported time difference measurements.

In another example, when a UE-based multi-RTT is used, the gNB may directly indicate the group delay parameters to the UE. For example, the indication may be via an RRC configuration, PosSIB, etc. Similar to the above example, the gNB may indicate to the UE whether gNB time difference measurements are corrected for the group delays at the gNB side or whether the UE should apply those corrections.

In some exemplary embodiments, the UE may indicate to the LMF 170 a transmit group delay associated with each SRS transmission and group delay associated with each PRS reception. As described above for the gNB, in some exemplary embodiments, the UE may not change the panel/filters such that the group delay for PRS reception (or SRS transmission) becomes different than the reported delay. In other exemplary embodiments, the UE may change the panel/filters as long as $d_{UE\text{-}RX}+d_{UE\text{-}TX}$ is fixed.

In one example, the UE may indicate, to the LMF 170, the values for ($d_{UE\text{-}RX}+d_{UE\text{-}TX}$), $d_{UE\text{-}RX}$, and/or $d_{UE\text{-}TX}$ via a LPP Provide Location Information message. The indication may include the reported delays and whether the reported values are applied in the reported time difference measurements.

For a UE-based multi-RTT positioning technique, the UE may be configured, e.g., via a LPP Request Location Information message, to provide the LMF 170 with the group delays that were applied in the calculation of position of the UE.

Examples

In a first example, a processor of a user equipment (UE) configured to perform operations is provided. The operations include receiving an effective timing error for a downlink time difference of arrival (DL-TDOA) positioning technique, wherein the effective timing error is associated with a set of base stations configured to transmit positioning reference signals (PRS) to the UE for the DL-TDOA, measuring the PRS transmitted by the set of base stations and applying the effective timing error to at least the PRS measurements of one of the set of base stations.

In a second example, the processor of the first example, wherein the effective timing error is received in an LTE Position Protocol (LPP) Provide Assistance Data message.

In a third example, the processor of the second example, wherein the LPP Provide Assistance Data message further comprises an indication of one of the set of base stations and a panel identification of the one of the set of base stations associated with the effective timing error.

In a fourth example, the processor of the first example, wherein the effective timing error is received via a broadcast of a system information block (SIB) by one of the set of base stations.

In a fifth example, the processor of the fourth example, wherein the SIB further comprises an indication of one of the set of base stations and a panel identification of the one of the set of base stations associated with the effective timing error.

In a sixth example, the processor of the first example, wherein the effective timing error comprises a time stamp indicating one of when the effective timing error is valid or when the effective timing error should be applied.

In a seventh example, the processor of the first example, wherein the effective timing error comprises one of an absolute value or an accumulated value to be added to a previous provided effective timing error value.

In an eighth example, the processor of the first example, wherein the operations further comprise calculating, using DL-TDOA, a position of the UE based on the PRS measurements and the effective timing error, transmitting a LPP Provide Location Information message comprising an indication of the position of the UE and an indication of whether the position has been calculated based on at least the effective timing error.

In a ninth example, the processor of the first example, wherein the operations further comprise transmitting a LPP Provide Location Information message comprising a received signal time difference (RSTD) measurement performed by the UE based on the DL-TDOA, wherein the LPP Provide Location Information message further comprises an indication of whether the RSTD measurement has been corrected based on at least the effective timing error.

In a tenth example, the processor of the first example, wherein the operations further comprise transmitting a received signal time difference (RSTD) measurement performed by the UE based on the DL-TDOA and transmitting a measurement associated with a downlink angle of departure (DL-AOD) positioning technique performed by the UE.

In an eleventh example, the processor of the tenth example, wherein the RSTD measurement comprises a plurality of RSTD measurements and the measurement associated with the DL-AOD comprise a plurality of measurements associated with the DL-AOD, wherein each of the plurality of RSTD measurements and plurality of measurements associated with the DL-AOD are associated with one of the set of base stations, an antenna panel, or a configuration of the positioning reference signals.

In a twelfth example, the processor of the tenth example, wherein the operations further comprise receiving a message indicating the antenna panel and spatial direction information that the one of the set of base stations used to transmit the positioning reference signals, wherein the UE tags each of the RSTD measurements and the measurements associated with the DL-AOD with the corresponding antenna panel and spatial direction information.

In a thirteenth example, a processor of a base station configured to perform operations is provided. The operations include receiving, from a location management function (LMF) of a network, an effective timing error for an uplink time difference of arrival (UL-TDOA) positioning technique, wherein the effective timing error is associated with positioning reference signals (PRS) to be received from a user equipment (UE) and measuring the PRS transmitted by the UE and applying the effective timing error to the PRS measurements of the UE.

In a fourteenth example, the processor of the thirteenth example, wherein the effective timing error is received in an NR Positioning Protocol A (NRPPa) Measurement Request message.

In a fifteenth example, the processor of the fourteenth example, wherein the NRPPa Measurement Request message further comprises an identification of one of a set of base stations that should apply the effective timing error.

In a sixteenth example, the processor of the thirteenth example, wherein the effective timing error is received in an NR Positioning Protocol A (NRPPa) Positioning Information Request message when the base station is identified as a serving cell.

In a seventeenth example, the processor of the thirteenth example, wherein the effective timing error comprises a time stamp indicating one of when the effective timing error is valid or when the effective timing error should be applied.

In an eighteenth example, the processor of the thirteenth example, wherein the effective timing error comprises one of an absolute value or an accumulated value to be added to a previous provided effective timing error value.

In a nineteenth example, the processor of the thirteenth example, wherein the effective timing error consists of only a synchronization error between the base station and at least one other base station that is performing the UL-TDOA positioning technique by receiving the PRS from the UE.

In a twentieth example, the processor of the thirteenth example, wherein the operations further comprise transmitting a NRPPa Measurement Response message comprising a relative time of arrival (RTOA) measurement based on the UL-TDOA and an indication of whether the RTOA has been corrected based on at least the effective timing error.

In a twenty first example, the processor of the thirteenth example, wherein receiving the effective timing error comprises transmitting a relative time of arrival (RTOA) measurement performed by the base station based on the UL-TDOA and transmitting a measurement associated with an uplink angle of arrival (UL-AOA) positioning technique performed by the base station.

In a twenty second example, the processor of the twenty first example, wherein the RTOA measurement comprises a plurality of RTOA measurements and the measurement associated with the UL-AOA comprise a plurality of measurements associated with the UL-AOA, wherein each of the plurality of RTOA measurements and plurality of measurements associated with the UL-AOA are associated with one of the set of base stations, an antenna panel, or a spatial direction used to receive the positioning reference signals.

In a twenty third example, the processor of the twenty first example, wherein the operations further comprise receiving a message indicating the antenna panel and spatial direction information to be used to receive the positioning reference signals.

In a twenty fourth example a processor of a user equipment (UE) configured to perform operations is provided. The operations include receiving an effective timing error for a multi-round trip time (m-RTT) positioning technique, wherein the effective timing error is associated with at least one base station the UE is configured to transmit and receive positioning reference signals (PRS) for the m-RTT, measuring the PRS transmitted by the base station and receiving, from the base station, PRS measurements performed by the base station for the PRS transmitted by the UE, and determining a location of the UE based on, at least, the PRS measurements of the UE, the PRS measurements of the base station and the effective timing error.

In a twenty fifth example, the processor of the twenty fourth example, wherein the effective timing error is received in a LTE Position Protocol (LPP) Provide Assistance Data message.

In a twenty sixth example, the processor of the twenty fifth example, wherein the effective timing error comprises one of (i) only a transmission group delay of the UE or (ii) a sum of a transmission group delay of the UE and a reception group delay of the base station.

In a twenty seventh example, a processor of a base station configured to perform operations is provided. The operations include receiving an effective timing error for a multi-round trip time (m-RTT) positioning technique, wherein the effective timing error is associated with at least one user equipment (UE) the base station is configured to transmit and receive positioning reference signals (PRS) for the m-RTT, measuring the PRS transmitted by the UE, receiving, from the UE, PRS measurements performed by the UE for the PRS transmitted by the base station and determining a location of the UE based on, at least, the PRS measurements of the UE, the PRS measurements of the base station and the effective timing error.

In a twenty eighth example, the processor of the twenty seventh example, wherein the effective timing error is received in an NR Positioning Protocol A (NRPPa) Measurement Request message including the effective timing error.

In a twenty ninth example, the processor of the twenty eighth example, wherein the effective timing error comprises one of (i) only a transmission group delay of the base station or (ii) a sum of a transmission group delay of the base station and a reception group delay of the UE.

In a thirtieth example, a processor of a base station configured to perform operations is provided. The operations include receiving, from a location management function (LMF) of a network, a message indicating an effective timing error for a downlink time difference of arrival (DL-TDOA) positioning technique, wherein the effective timing error is associated with a set of base stations configured to transmit positioning reference signals (PRS) to the UE for the DL-TDOA and broadcasting a system information block (SIB) comprising the effective timing error.

In a thirty first example, the processor of the thirtieth example, wherein the effective timing error is associated with an antenna panel and spatial direction of the base station, wherein the operations further comprise receiving, from the LMF, a message indicating an antenna panel and spatial direction the base station should transmit the PRS.

In a thirty second example, a user equipment (UE) having a transceiver configured to communicate with a network is provided. The UE further has any one of the processors of first example to the twelfth example or the twenty fourth example to the twenty sixth example.

In a thirty third example, a base station having a transceiver configured to communicate with a network is provided. The base station further has any one of the processors of thirteenth example to the twenty third or the twenty seventh example to the thirty first example.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

The invention claimed is:

1. One or more processors of a network component configured to perform operations comprising:

receiving an indication of an effective timing error for a downlink time difference of arrival (DL-TDOA) positioning technique, wherein the effective timing error is associated with one or more base stations configured to transmit positioning reference signals for the DL-TDOA;

providing the effective timing error to a user equipment (UE) performing operations related to the DL-TDOA; and generating, for transmission to the UE, an LTE Position Protocol (LPP) Provide Assistance Data message including an identifier associated with multiple transmission and reception points (TRPs) and the effective timing error, wherein the identifier associated with the multiple TRPs and the effective timing error is used for UE-based positioning techniques.

2. The one or more processors of claim 1, wherein the LPP Provide Assistance Data message further comprises an indication of one of the set of base stations and a panel identification of the one of the set of base stations associated with the effective timing error.

3. The one or more processors of claim 2, wherein the operations further comprise:

instructing one of the set of base stations to broadcast a system information block (SIB) including the effective timing error, an indication of one of the set of base stations and a panel identification of the one of the set of base stations associated with the effective timing error.

4. The one or more processors of claim 1, wherein the effective timing error comprises a time stamp indicating one of when the effective timing error is valid or when the effective timing error is to be applied.

5. The one or more processors of claim 1, wherein the effective timing error comprises one of an absolute value or an accumulated value to be added to a previous provided effective timing error value.

6. The one or more processors of claim 1, wherein the operations further comprise:

receiving, from the UE, a LPP Provide Location Information message comprising an indication of a position of the UE, wherein the UE has calculated the position based on the DL-TDOA, and wherein the LPP Provide Location Information message further comprises an indication of whether the position has been calculated based on at least the effective timing error.

7. The one or more processors of claim 1, wherein the operations further comprise:

receiving, from the UE, a LPP Provide Location Information message comprising a received signal time difference (RSTD) measurement performed by the UE based on the DL-TDOA, wherein the LPP Provide Location Information message further comprises an indication of whether the RSTD measurement has been corrected based on at least the effective timing error.

8. The one or more processors of claim 1, wherein receiving the effective timing error comprises:

receiving, from the UE, a received signal time difference (RSTD) measurement performed by the UE based on the DL-TDOA;

receiving, from the UE, a measurement associated with a downlink angle of departure (DL-AOD) positioning technique performed by the UE; and calculating the effective timing error based on at least the RSTD and the measurement associated with the DL-AOD.

9. The one or more processors of claim 1, wherein the effective timing error is associated with the set of base stations and an antenna panel of each of the set of base stations, wherein the operations further comprise:

sending, to the set of base stations, a message indicating the antenna panel from which each of the set of base stations are to transmit the positioning reference signals.

10. One or more processor of a network component configured to perform operations comprising:

receiving an indication of an effective timing error for an uplink time difference of arrival (UL-TDOA) positioning technique, wherein the effective timing error is associated with a set of base stations configured to receive positioning reference signals from a user equipment (UE) for the UL-TDOA;

providing the effective timing error to at least one of the set of base stations performing operations related to the UL-TDOA; and generating, for transmission to the UE, an LTE Position Protocol (LPP) Provide Assistance Data message including an identifier associated with multiple transmission and reception points (TRPs) and the effective timing error, wherein the identifier associated with the multiple TRPs and the effective timing error is used for UE-based positioning techniques.

11. The one or more processors of claim 10, wherein the operations further comprise:

generating, for transmission to one of the set of base stations identified as a serving cell, an NR Positioning Protocol A (NRPPa) Positioning Information Request message including the effective timing error.

12. The one or more processors of claim 10, wherein the effective timing error comprises a time stamp indicating one of when the effective timing error is valid or when the effective timing error is to be applied.

13. The one or more processors of claim 10, wherein the operations further comprise:

receiving, from one of the base stations, a NRPPa Measurement Response message comprising a relative time of arrival (RTOA) measurement based on the UL-TDOA, and wherein the NRPPa Measurement Response message further comprises an indication of whether the RTOA has been corrected based on at least the effective timing error.

14. The one or more processors of claim 10, wherein receiving the effective timing error comprises:

receiving, from one of the base stations, a relative time of arrival (RTOA) measurement performed by the base station based on the UL-TDOA;

receiving, from the base station, a measurement associated with an uplink angle of arrival (UL-AOA) positioning technique performed by the base station; and calculating the effective timing error based on at least the RTOA and the measurement associated with the UL-AOA.

15. One or more processors of a network component configured to perform operations comprising:

receiving an indication of an effective timing error for a multi-round trip time (m-RTT) positioning technique, wherein the effective timing error is associated with at least one base station and a user equipment (UE) configured to transmit and receive positioning reference signals for the m-RTT;

providing the effective timing error to one of the base station or the UE; and generating, for transmission to the UE, an LTE Position Protocol (LPP) Provide Assistance Data message including an identifier associated with multiple transmission and reception points (TRPs) and the effective timing error, wherein the identifier associated with the multiple TRPs and the effective timing error is used for UE-based positioning techniques.

16. The one or more processors of claim 15, wherein the operations further comprise:

receiving, from one of the base station or the UE, a message comprising a time difference measurement associated with the m-RTT, wherein the message further comprises an indication of whether the time difference measurement was corrected using the effective timing error.

* * * * *